(No Model.) 4 Sheets—Sheet 2.

A. SCHMID.
ELECTRIC MOTOR AND FRAME.

No. 442,459. Patented Dec. 9, 1890.

(No Model.) 4 Sheets—Sheet 3.

A. SCHMID.
ELECTRIC MOTOR AND FRAME.

No. 442,459. Patented Dec. 9, 1890.

(No Model.) 4 Sheets—Sheet 4.

A. SCHMID.
ELECTRIC MOTOR AND FRAME.

No. 442,459. Patented Dec. 9, 1890.

Witnesses
James W. Smith
Richard V. Popham

Inventor
Albert Schmid
By his Attorney
Charles A. Terry

UNITED STATES PATENT OFFICE.

ALBERT SCHMID, OF ALLEGHENY, ASSIGNOR TO THE WESTINGHOUSE ELECTRIC COMPANY, OF PITTSBURG, PENNSYLVANIA.

ELECTRIC MOTOR AND FRAME.

SPECIFICATION forming part of Letters Patent No. 442,459, dated December 9, 1890.

Application filed August 1, 1890. Serial No. 360,640. (No model.)

*To all whom it may concern:*

Be it known that I, ALBERT SCHMID, a citizen of the Republic of Switzerland, residing in Allegheny, in the county of Allegheny and State of Pennsylvania, have invented certain new and useful Improvements in Electric Motors and Frames for Same, (Case No. 432,) of which the following is a specification.

The invention relates to the construction of electric motors and the frame for supporting the same, and particularly to the class of electric motors employed for propelling cars.

The invention involves certain improvements in the construction of the various parts of the motor itself and the supporting-frame.

The object of the invention is to cheapen the construction, render it more durable and convenient to handle and repair, and to lessen the number of its parts.

The invention also aims to render the motor as noiseless as practicable in its operation.

The invention will be described in detail in connection with the accompanying drawings, in which—

Figure 1:
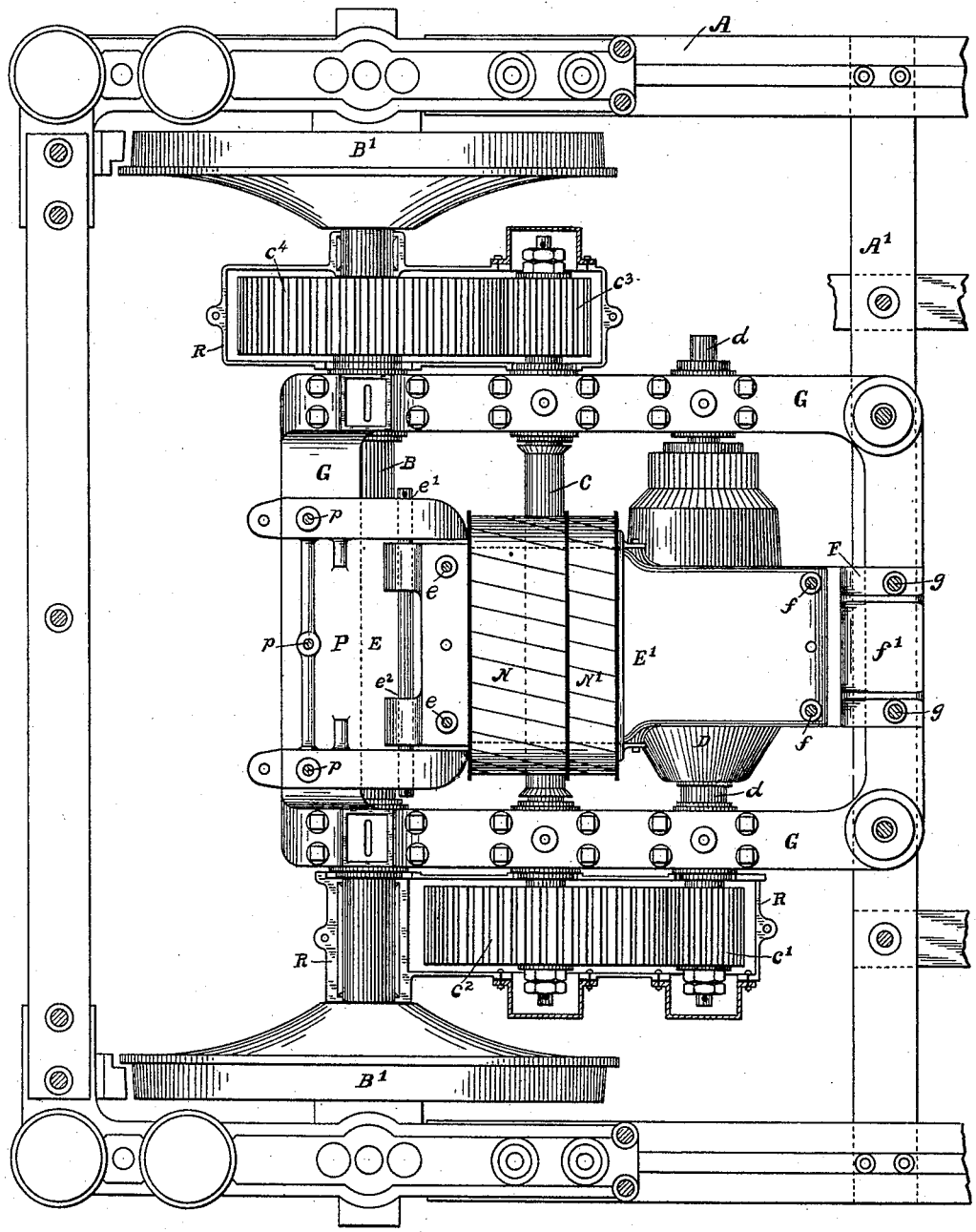
Figure 2:
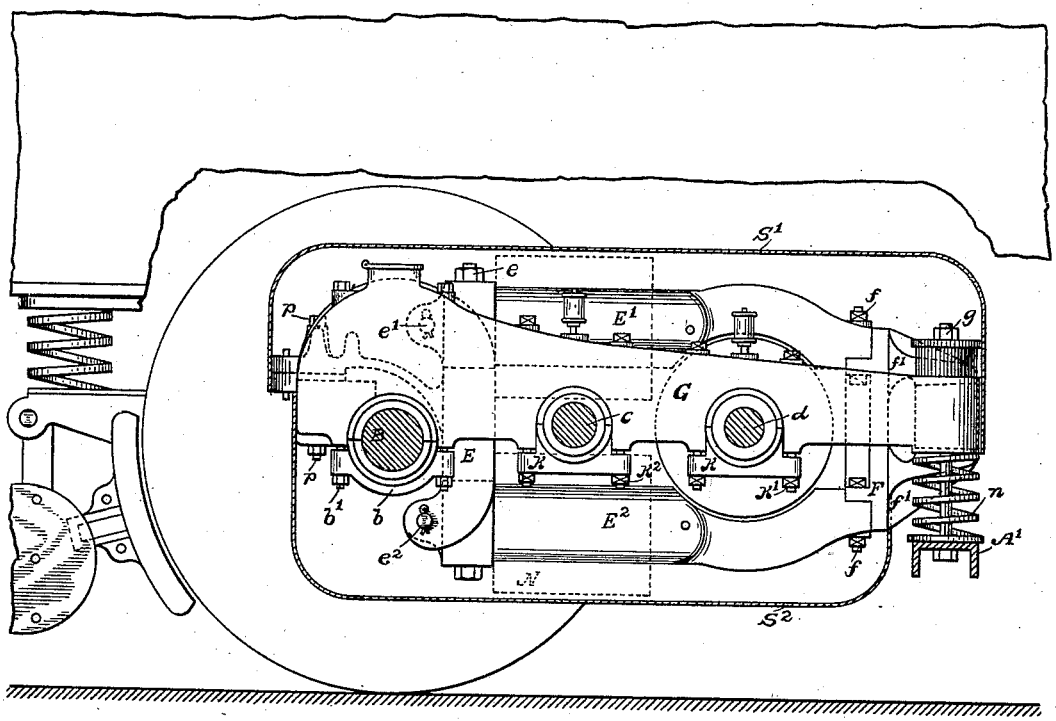
Figure 3:
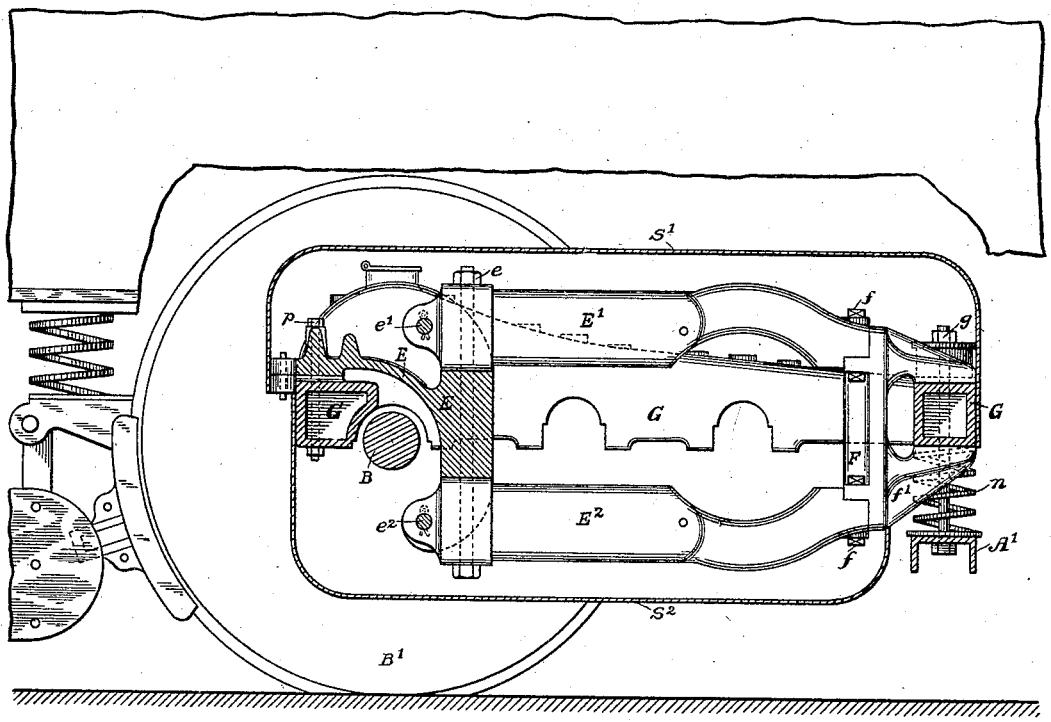
Figure 4:
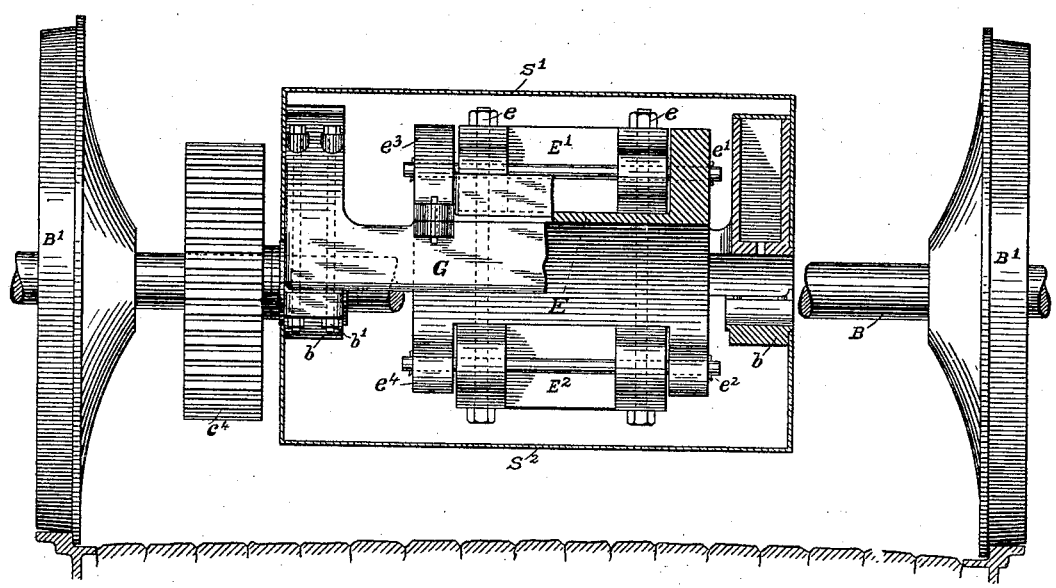

Figure 1 is a plan, and Fig. 2 a side view, of the motor and frame as applied to the car-truck. Fig. 3 is a side view partly in section, and Fig. 4 is an end view partly in section.

Referring to the drawings, A represents a portion of the truck-frame, and B' B' two of the car-wheels. The axle B of the wheels supports one end of the frame G of the motor. The entire frame G is formed in one rectangular piece and is rigid, being free from bolts and joints which would be liable to become loosened by the strain due to the long-continued use of the motor. The frame is constructed to receive the upper portions of the bearings of the armature-shaft $d$ and the intermediate shaft $c$ of the motor, and also to support the field-magnet cores E' and E². One end of the frame G rests upon the axle B and the other end is supported through suitable springs $n$ upon a cross-beam A', secured to the truck-frame A.

The armature D is carried on a shaft $d$, which is provided with a pinion $c'$. This pinion engages a gear-wheel $c^2$ upon the shaft $c$. The shaft $c$ also carries a pinion $c^3$, which in turn engages a gear-wheel $c^4$ upon the axle B of the truck-wheels. The power of the motor is communicated to the car through this system of gears.

The bearings of the shafts $d$ and $c$ are placed, as already stated, in the lower side of the frame G, and they are closed by separable pieces $k$, held in place by bolts $k'$ and $k^2$. A similar construction is adapted for supporting the end of the frame G upon the axle B, separable plate $b$ being fastened by bolts $b'$ to the under side of the frame beneath the axle B at the bearing-points.

As it is frequently necessary to have access to the armature of a motor for various reasons, it is desirable that means should be provided for removing it from the field-magnet with as little disturbance of the other portions of the motor as possible. For this reason the lower field-magnet core E² is pivoted or hinged to the back piece E, as indicated at $e^2$, in such manner that the end adjacent to the armature may be dropped downward when desired. The upper field-magnet core E' may also be pivoted in like manner, as shown at $e'$, so that it may be turned back if it should be desired to reach the armature from above. The back piece E is shown as constructed with rearwardly-projecting curved extensions $e^3$ and $e^4$, to which the respective cores are pivoted. This construction allows ample room for the throwing back of the hinged cores. The back-piece itself is supported from the frame G by means of a web or projection P, which passes above the end of the frame and is secured by bolts $p$. The ends of the cores beyond the armature are held in position by means of a non-magnetic piece F, to which the pole-pieces are bolted, as indicated at $f$. This non-magnetic piece is constructed with extensions or arms $f'$ $f'$, which receive the frame G of the motor and to which they are secured by bolts $g$. To prevent any jarring at the points of hinging the field-magnet cores, bolts $e$ are carried through the two cores near their pivoted ends. These serve to bind both cores firmly. By loosening the bolts $e, f,$ and $k'$ the lower field-magnet core may be dropped and the armature removed from the frame.

The field-magnet coils N and N' may be wound in suitable forms and properly insulated and then slipped upon the field-magnet cores. By thus winding them apart from the cores they may be more carefully wound and thoroughly insulated, and thus the liability of short-circuiting is avoided.

For the purpose of excluding the dust and protecting the gears, they may be inclosed in cases R R, of sheet iron or other suitable material. They are extended to surround the axle B. At other points they are held in position by the axles of the gear, and they thus receive the relative movements of the motor-frame. These cases may also contain a suitable quantity of lubricating material, such as a heavy oil. The gears running in these will have less friction and make less noise than when running in the open air.

The entire motor may be incased by a sheet-iron box, as indicated in Figs. 2 and 3. This box may be made in two sections S' S², respectively, fitting above and below the motor. These serve to exclude the dust from the entire apparatus.

In an application filed by me on the 7th day of November, 1890, Serial No. 370,643, I have claimed certain features of the construction herein described.

I claim as my invention—

1. In a frame for electric motors, the combination of a single rectangular casting receiving the upper portions of the bearings for the shafts, and separable lower bearings for the shafts bolted to the casting, substantially as described.

2. In a motor for electric cars, the combination of the rectangular casting forming the body of the motor-frame, field-magnet cores, a back piece to which the cores are pivoted, and an extension from the back piece resting upon the frame, substantially as described.

3. In a motor for electric cars, the combination of a frame constructed in a single piece, field-magnet cores, a back piece to which the lower field-magnet core is pivoted, said back piece being supported from the frame, and a non-magnetic support for the field-magnet poles carried by the frame, substantially as described.

4. In a motor for electric cars, the combination of the frame constructed in a single piece, field-magnet cores, and a back piece to which the lower core is pivoted, said back piece being supported from the frame, substantially as described.

5. In an electric motor for street-cars, the combination of the field-magnet cores, their respective pole-pieces, a frame supporting the same, and an end piece to which the pole-pieces are fastened passing above and below the corresponding portion of the frame, substantially as described.

6. The combination of the field-magnet cores, the back piece to which the cores are hinged or pivoted, and the bolts extending through the cores and the back piece, substantially as described.

7. The back piece for an electric motor, consisting of the piece E, having supporting-extensions $e^3$ and $e^4$ integral therewith, substantially as described.

8. The non-magnetic casting F for coupling the ends of the pole-pieces of an electric motor, constructed with the two prongs $f^2$ $f^2$ for receiving the supporting-frame, substantially as described.

9. In an electric motor, a back piece having one or more rearwardly-curved extensions $e^4$ for receiving the ends of a field-magnet core, substantially as described.

10. The combination, with a car, of an electric motor and its frame, one end of the frame being pivoted upon an axle of the car, and a gear-protecting box surrounding the gears of the motor and also pivoted upon or extending around the said axle.

11. The combination, with an electric motor for cars, of an inclosing-case for the motor, formed in two parts, the one inclosing the upper portion of the motor and the other incasing the lower portion, substantially as described.

In testimony whereof I have hereunto subscribed my name this 30th day of July, A. D. 1890.

ALBERT SCHMID.

Witnesses:
J. M. SATE, Jr.,
J. W. SMITH.